United States Patent
Shiose (10) Patent No.: US 10,896,258 B2
(45) Date of Patent: Jan. 19, 2021

(54) INFORMATION PROCESSING APPARATUS CAPABLE OF DETECTING FALSIFICATION IN PROGRAMS, AND FALSIFICATION DETECTING METHOD

(71) Applicant: KYOCERA Document Solutions Inc., Osaka (JP)

(72) Inventor: Masato Shiose, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 370 days.

(21) Appl. No.: 16/143,197

(22) Filed: Sep. 26, 2018

(65) Prior Publication Data

US 2019/0130111 A1    May 2, 2019

(30) Foreign Application Priority Data

Oct. 26, 2017    (JP) .................................. 2017-207098

(51) Int. Cl.
*G06F 21/57* (2013.01)
*H04L 9/32* (2006.01)
*H04L 9/08* (2006.01)

(52) U.S. Cl.
CPC ............ *G06F 21/575* (2013.01); *G06F 21/57* (2013.01); *H04L 9/0894* (2013.01); *H04L 9/32* (2013.01); *H04L 9/3247* (2013.01); *H04L 9/08* (2013.01)

(58) Field of Classification Search
None
See application file for complete search history.

(56) References Cited

U.S. PATENT DOCUMENTS

| | | | |
|---|---|---|---|
| 10,747,882 B2 * | 8/2020 | Liu ....................... | G06F 21/575 |
| 2003/0145191 A1 * | 7/2003 | Park ...................... | G06F 9/4418 713/1 |
| 2008/0226080 A1 * | 9/2008 | Li ......................... | H04L 9/0897 380/277 |
| 2012/0210115 A1 * | 8/2012 | Park ...................... | H04L 9/3247 713/2 |
| 2015/0058979 A1 * | 2/2015 | Peeters ................. | G06F 21/575 726/22 |

(Continued)

FOREIGN PATENT DOCUMENTS

| | | | |
|---|---|---|---|
| JP | 201653753 A | 4/2016 | |
| WO | WO 2016/131553 A1 * | 8/2016 | ............. G06F 21/57 |

*Primary Examiner* — Tanh Q Nguyen
(74) *Attorney, Agent, or Firm* — Alleman Hall Creasman & Tuttle LLP (57) ABSTRACT

An information processing apparatus includes a first storage portion, a connection portion, and a detection processing portion. The first storage portion stores a first decryption key used to decrypt a first electronic signature, wherein the first electronic signature and a second electronic signature have been added to detection target programs that are expanded into a memory during a start-up of the information processing apparatus. The connection portion is configured to be connected with a second storage portion storing a second decryption key used to decrypt the second electronic signature. When the second storage portion is connected to the connection portion, the detection processing portion detects presence/absence of falsification in the detection target programs by using second decrypted data that is acquired by decrypting the second electronic signature by using the second decryption key.

6 Claims, 5 Drawing Sheets

(56) References Cited

U.S. PATENT DOCUMENTS

| | | |
|---|---|---|
| 2016/0065369 A1 | 3/2016 | Kakutani |
| 2016/0087801 A1* | 3/2016 | Jones .................... G06F 21/575 |
| | | 713/176 |
| 2018/0091315 A1* | 3/2018 | Singhal ................. G06F 21/575 |
| 2019/0130111 A1* | 5/2019 | Shiose .................. H04L 9/0894 |

* cited by examiner

INFORMATION PROCESSING APPARATUS CAPABLE OF DETECTING FALSIFICATION IN PROGRAMS, AND FALSIFICATION DETECTING METHOD

INCORPORATION BY REFERENCE

This application is based upon and claims the benefit of priority from the corresponding Japanese Patent Application No. 2017-207098 filed on Oct. 26, 2017, the entire contents of which are incorporated herein by reference.

BACKGROUND

The present disclosure relates to an information processing apparatus and a falsification detecting method executed in an information processing apparatus.

There is known an information processing apparatus that is started up by a secure boot in which only programs confirmed not to have falsification are executed. In this type of information processing apparatus, an electronic signature is added to each of detection target programs such as a secondary boot loader and an OS, the secondary boot loader being expanded into a memory during a start-up of the information processing apparatus. In addition, the information processing apparatus is provided with a storage portion such as a ROM for storing decryption keys that are used to decrypt the electronic signatures. In the information processing apparatus, the electronic signatures and the decryption keys are used to detect falsification in the detection target programs during a start-up of the information processing apparatus.

In addition, in the information processing apparatus, the decryption keys may be stored in another storage portion such as a TPM (Trusted Platform Module) that is replaceably connected to the information processing apparatus.

SUMMARY

An information processing apparatus according to an aspect of the present disclosure includes a first storage portion, a connection portion, a determination processing portion, and a detection processing portion. The first storage portion stores a first decryption key that is used to decrypt a first electronic signature, wherein the first electronic signature and a second electronic signature have been added to detection target programs that are expanded into a memory during a start-up of the information processing apparatus. The connection portion is configured to be connected with a second storage portion storing a second decryption key that is used to decrypt the second electronic signature and is different from the first decryption key. The determination processing portion determines whether or not the second storage portion is connected to the connection portion. When the determination processing portion has determined that the second storage portion is not connected to the connection portion, the detection processing portion detects presence/absence of falsification in the detection target programs by using first decrypted data that is acquired by decrypting the first electronic signature by using the first decryption key; and when the determination processing portion has determined that the second storage portion is connected to the connection portion, the detection processing portion detects presence/absence of falsification in the detection target programs by using second decrypted data that is acquired by decrypting the second electronic signature by using the second decryption key.

A falsification detecting method according to another aspect of the present disclosure is executed in an information processing apparatus including a first storage portion and a connection portion, the first storage portion storing a first decryption key that is used to decrypt a first electronic signature, wherein the first electronic signature and a second electronic signature have been added to detection target programs that are expanded into a memory during a start-up of the information processing apparatus, the connection portion being configured to be connected with a second storage portion storing a second decryption key that is used to decrypt the second electronic signature and is different from the first decryption key, the falsification detecting method including: determining whether or not the second storage portion is connected to the connection portion; and when it has been determined that the second storage portion is not connected to the connection portion, detecting presence/absence of falsification in the detection target programs by using first decrypted data that is acquired by decrypting the first electronic signature by using the first decryption key, and when it has been determined that the second storage portion is connected to the connection portion, detecting presence/absence of falsification in the detection target programs by using second decrypted data that is acquired by decrypting the second electronic signature by using the second decryption key.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Outlined Configuration of Image Forming Apparatus 10]

First, an outlined configuration of an image forming apparatus 10 according to an embodiment of the present disclosure is described with reference to FIG. 1 to FIG. 3.

Figure 1:
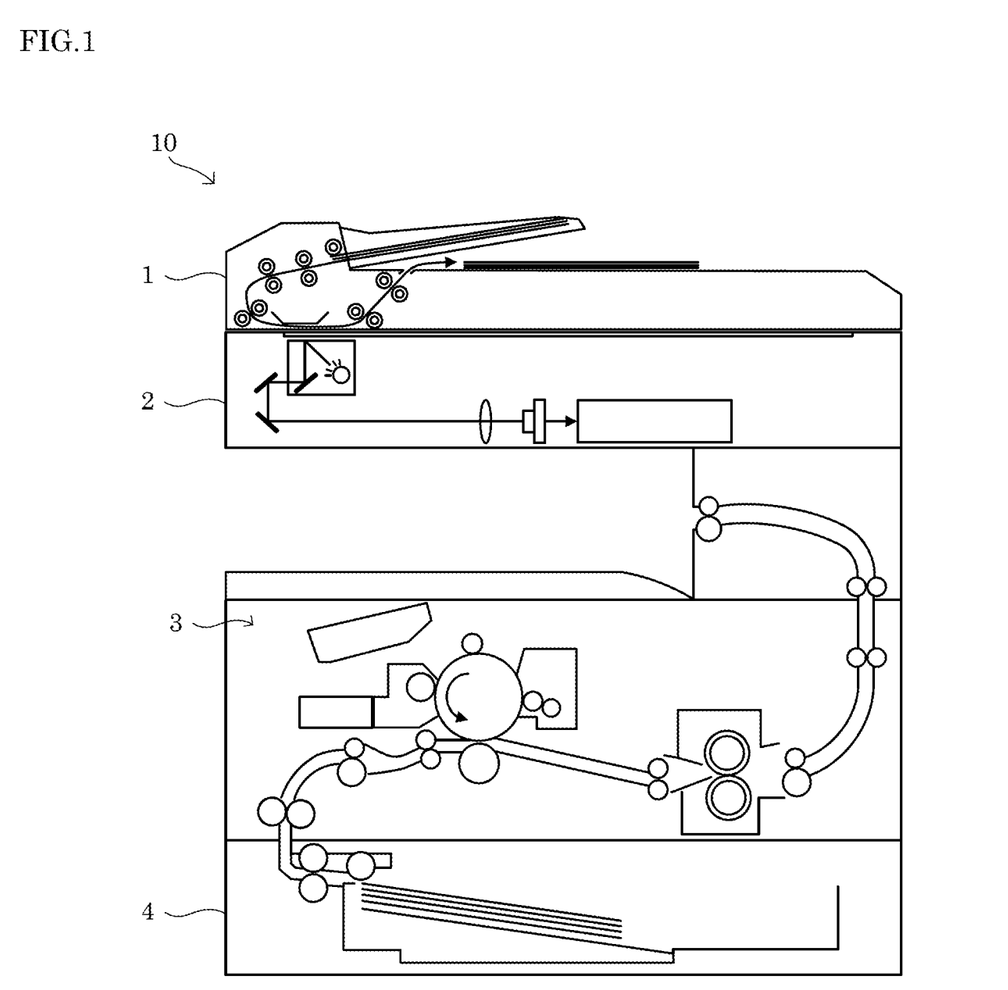
FIG. 1 is a diagram showing a configuration of an image forming apparatus according to an embodiment of the present disclosure.

Here, FIG. 1 is a schematic cross-sectional diagram showing a configuration of the image forming apparatus 10.

The image forming apparatus 10 is a multifunction peripheral having a plurality of functions including a print function for forming an image based on image data, as well as a scan function, a facsimile function, and a copy function. Here, the image forming apparatus 10 is an example of the information processing apparatus of the present disclosure. It is noted that the present disclosure is applicable to information processing apparatuses such as a scanner, a printer, a facsimile apparatus, a copier, a personal computer, a notebook computer, a smartphone, and a tablet terminal.

Figure 2:
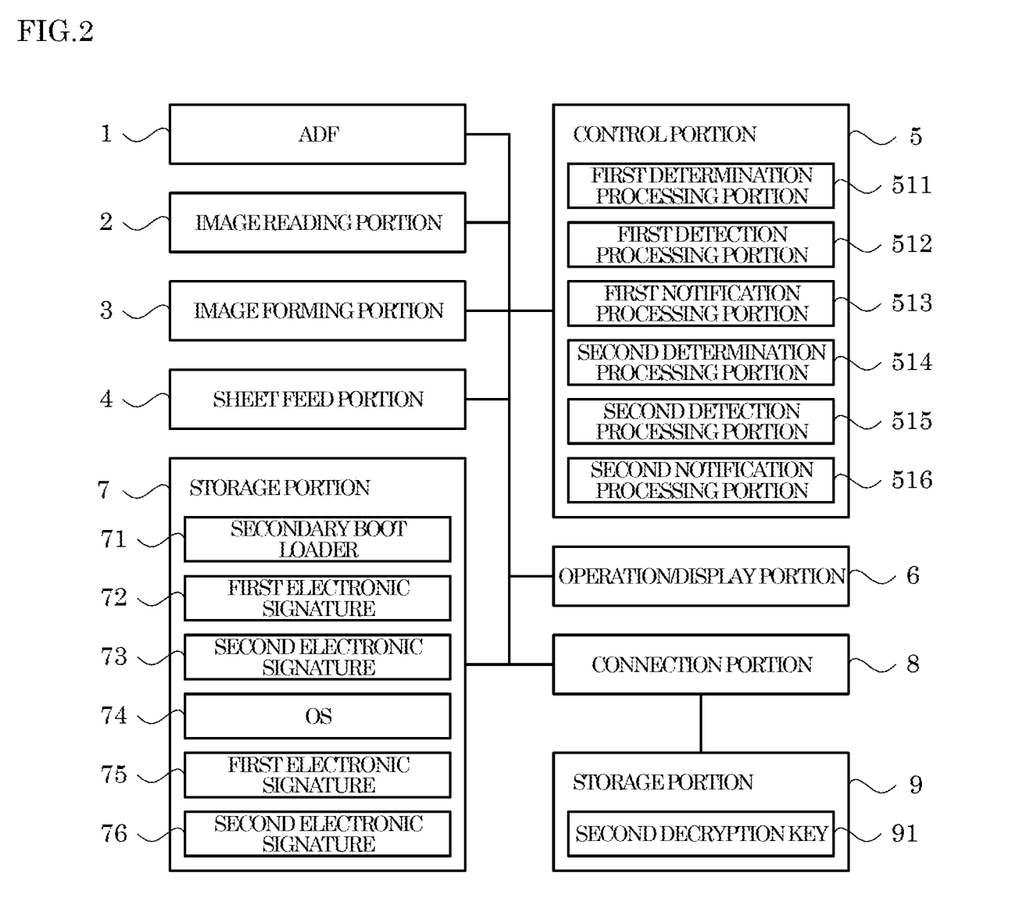
FIG. 2 is a block diagram showing a system configuration of the image forming apparatus according to the embodiment of the present disclosure.

As shown in FIG. 1 and FIG. 2, the image forming apparatus 10 includes an ADF (Automatic Document Feeder) 1, an image reading portion 2, an image forming portion 3, a sheet feed portion 4, a control portion 5, an operation/display portion 6, a storage portion 7, a connection portion 8, and a storage portion 9.

The ADF 1 feeds a document sheet so that the document sheet can be read by the image reading portion 2. Specifically, the ADF 1 includes a document sheet setting portion, a plurality of conveyance rollers, a document sheet pressing, and a sheet discharge portion. The ADF 1 conveys a document sheet placed on the document sheet setting portion, to the sheet discharge portion via a reading position where image data is read from the document sheet by the image reading portion 2.

The image reading portion 2 reads image data from the document sheet. Specifically, the image reading portion 2 includes a document sheet table, a light source, a plurality of mirrors, an optical lens, and a CCD. The image reading portion 2 reads image data from a document sheet placed on the document sheet table and from a document sheet conveyed by the ADF 1.

The image forming portion 3 forms an image by the electrophotographic system based on the image data. Specifically, the image forming portion 3 includes a photoconductor drum, a charging device, a laser scanning device, a developing device, a transfer roller, a cleaning device, a fixing roller, a pressure roller, and a sheet discharge tray. The image forming portion 3 forms an image based on image data read by the image reading portion 2, or image data input from an external information processing apparatus such as a personal computer. It is noted that the image forming portion 3 may form an image by another image forming system such as an inkjet system.

The sheet feed portion 4 supplies a sheet to the image forming portion 3. Specifically, the sheet feed portion 4 includes a sheet feed cassette and a plurality of conveyance rollers. In the image forming apparatus 10, an image is formed on a sheet supplied from the sheet feed portion 4, and the sheet with the image formed thereon is discharged to the sheet discharge tray.

The control portion 5 comprehensively controls the components of the image forming apparatus 10. For example, the control portion 5 is an ASIC. As shown in FIG. 3, the control portion 5 includes a CPU 51, a ROM 52, a RAM 53, an OTPROM (One-Time Programmable Read-Only Memory) 54, and an input/output portion 55. In the control portion 5, the CPU 51, the RAM 53, the OTPROM 54, and the input/output portion 55 are connected in such a manner as to be communicable with each other via a bus 50 (see FIG. 3).

The CPU 51 is a processor configured to execute various calculation processes.

The ROM 52 is a nonvolatile storage device. The ROM 52 stores control programs for causing the CPU 51 to execute various processes. The CPU 51 comprehensively controls the image forming apparatus 10 by executing the control programs stored in the ROM 52.

Figure 3:
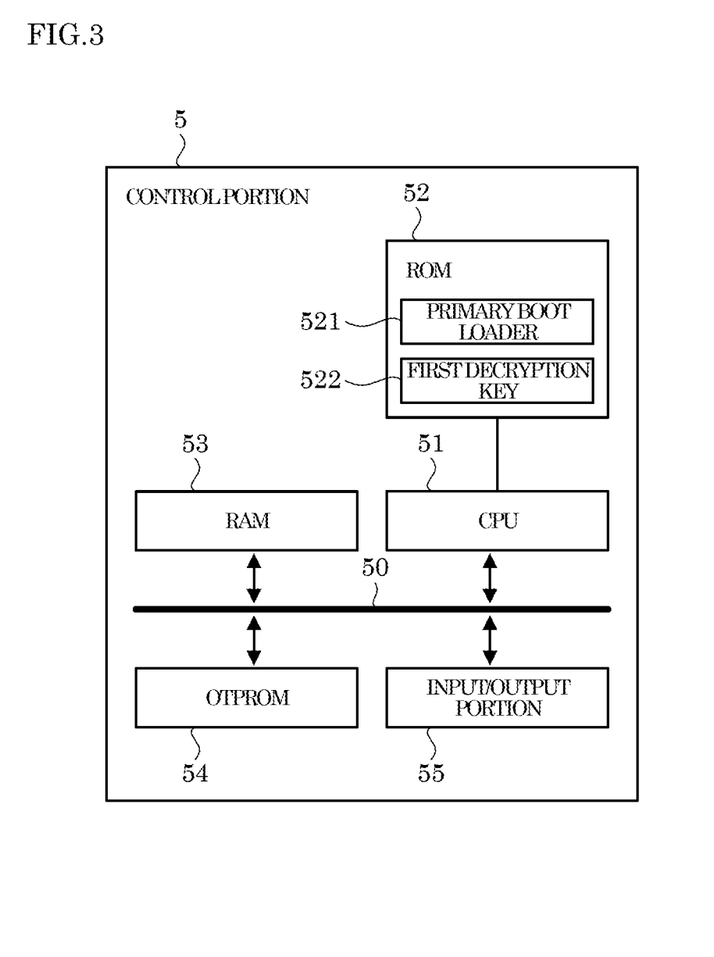
FIG. 3 is a block diagram showing a configuration of a control portion of the image forming apparatus according to the embodiment of the present disclosure.

As shown in FIG. 3, the ROM 52 stores a primary boot loader 521. The primary boot loader 521 is a program that, during a start-up of the image forming apparatus 10, expands a secondary boot loader 71 (see FIG. 2) stored in the storage portion 7 into the RAM 53.

The RAM 53 is a volatile storage device. The CPU 51 uses the RAM 53 as a temporary storage memory (working area) when it executes the various processes.

The OTPROM 54 is a nonvolatile storage device to which data can be written by using a dedicated writer, and data written thereto cannot be deleted. It is noted that the control portion 5 may include, instead of the OTPROM 54, a nonvolatile storage device such as an EEPROM to/from which data can be written/deleted. In addition, the control portion 5 may not include the OTPROM 54.

The input/output portion 55 is an interface that executes a data transfer process of transferring data with components outside the control portion 5.

The operation/display portion 6 inputs various types of information to the control portion 5 in response to user operations, and outputs various types of information in response to control instructions from the control portion 5. Specifically, the operation/display portion 6 includes a display portion and an operation portion, wherein the display portion is a liquid crystal display or the like, and the operation portion is operation keys, a touch panel or the like.

The storage portion 7 is a nonvolatile storage device. For example, the storage portion 7 is an NVRAM.

As shown in FIG. 2, the storage portion 7 stores a secondary boot loader 71 and an OS (Operating System) 74. The secondary boot loader 71 is a program for expanding the OS 74 stored in the storage portion 7 into the RAM 53 during a start-up of the image forming apparatus 10. The secondary boot loader 71 is expanded in the RAM 53 and executed during the start-up of the image forming apparatus 10. The OS 74 is a program for starting up the image forming apparatus 10. The OS 74 is expanded in the RAM 53 and executed during the start-up of the image forming apparatus 10. Here, the secondary boot loader 71 and the OS 74 are an example of the detection target programs of the present disclosure. In addition, the RAM 53 is an example of the memory of the present disclosure.

It is noted that the secondary boot loader 71 may be a program for expanding, into the RAM 53, another program for expanding the OS 74 into the RAM 53, or a program for expanding, into the RAM 53, a part of a group of other programs for expanding the OS 74 into the RAM 53.

The image forming apparatus 10 is started up by a secure boot in which only programs confirmed not to have falsification are executed. Specifically, as shown in FIG. 2, the storage portion 7 stores a first electronic signature 72 and a first electronic signature 75. In addition, as shown in FIG. 3, the ROM 52 of the control portion 5 stores a first decryption key 522. In the image forming apparatus 10, during the start-up thereof, the first electronic signature 72, the first electronic signature 75, and the first decryption key 522 are used to detect falsification in the secondary boot loader 71 and the OS 74. Here, the ROM 52 is an example of the first storage portion of the present disclosure.

The first electronic signature 72 is an electronic signature attached to the secondary boot loader 71 and is used to detect falsification in the secondary boot loader 71. For example, a hash value of the secondary boot loader 71 is acquired by using a predetermined hash function, and the first electronic signature 72 is generated by encrypting the acquired hash value.

The first electronic signature 75 is an electronic signature attached to the OS 74 and is used to detect falsification in the OS 74. For example, a hash value of the OS 74 is acquired by using the hash function, and the first electronic signature 75 is generated by encrypting the acquired hash value.

The first decryption key 522 is a piece of data that is used to decrypt the first electronic signature 72 and the first electronic signature 75. For example, the first decryption key 522 is a private key in the public key cryptosystem. In this case, an encryption key that was used to encrypt the first electronic signature 72 and the first electronic signature 75 is a public key corresponding to the first decryption key 522.

It is noted that the first decryption key 522 may be a public key in the public key cryptosystem. In this case, an encryption key that was used to encrypt the first electronic signature 72 and the first electronic signature 75 is a private key corresponding to the first decryption key 522. In addition, the first decryption key 522 may be a key in the common key cryptosystem. In this case, an encryption key that was used to encrypt the first electronic signature 72 and the first electronic signature 75 is the first decryption key 522.

Meanwhile, the control portion 5 may be disassembled and the content of the first decryption key 522 stored in the ROM 52 may be known to the disassembling actor. If the content of the first decryption key 522 is known to the desassembling actor, the first electronic signature 72 and the first electronic signature 75 may be forged, and falsified secondary boot loader 71 and falsified OS 74 may be executed during a start-up of the image forming apparatus 10.

As a measure for the above-described problem, a storage portion 9 (see FIG. 2) may be added to the image forming apparatus 10 to store a second decryption key 91 (see FIG. 2) that is different from the first decryption key 522, and the image forming apparatus 10 may use the second decryption key 91 to detect falsification in the secondary boot loader 71 and the OS 74. However, according to a conventional technology, in order for the image forming apparatus 10 to use the second decryption key 91 to detect falsification in the secondary boot loader 71 and the OS 74, it is necessary to change the content of each of the programs that are executed in the image forming apparatus 10 during the start-up.

On the other hand, in the image forming apparatus 10 according to the embodiment of the present disclosure, as described in the following, it is possible to detect falsification in the programs that are executed during the start-up, by using the second decryption key 91 stored in the storage portion 9 that is an added storage portion, without changing the content of the programs.

The connection portion 8 is a connector that is connected to the storage portion 9.

The storage portion 9 stores the second decryption key 91 that is different from the first decryption key 522. Here, the storage portion 9 is an example of the second storage portion of the present disclosure.

Here, as shown in FIG. 2, the storage portion 7 stores a second electronic signature 73 and a second electronic signature 76.

The second electronic signature 73 is an electronic signature attached to the secondary boot loader 71 and is used to detect falsification in the secondary boot loader 71, wherein the second electronic signature 73 is different from the first electronic signature 72. For example, a hash value of the secondary boot loader 71 is acquired by using the hash function, and the second electronic signature 73 is generated by encrypting the acquired hash value.

The second electronic signature 76 is an electronic signature attached to the OS 74 and is used to detect falsification in the OS 74, wherein the second electronic signature 76 is different from the first electronic signature 75. For example, a hash value of the OS 74 is acquired by using the hash function, and the second electronic signature 76 is generated by encrypting the acquired hash value.

The second decryption key 91 is a piece of data that is used to decrypt the second electronic signature 73 and the second electronic signature 76. For example, the second decryption key 91 is a private key in the public key cryptosystem. In this case, an encryption key that was used to encrypt the second electronic signature 73 and the second electronic signature 76 is a public key corresponding to the second decryption key 91.

It is noted that the second decryption key 91 may be a public key in the public key cryptosystem. In this case, an encryption key that was used to encrypt the second electronic signature 73 and the second electronic signature 76 is a private key corresponding to the second decryption key 91. In addition, the second decryption key 91 may be a key in the common key cryptosystem. In this case, an encryption key that was used to encrypt the second electronic signature 73 and the second electronic signature 76 is the second decryption key 91.

For example, in the storage portion 9, when a predetermined triggering condition is satisfied, the second decryption key 91 is made unreadable. For example, the triggering condition is that: a part or all of the exterior of the storage portion 9 has been removed; a part or all of the exterior has been deformed or damaged; a pressure at or over a predetermined value has been applied to the exterior; or outside air has mixed in the inside of the exterior. For example, when the triggering condition is satisfied, the storage portion 9 may destroy itself so that the second decryption key 91 cannot be read therefrom. It is noted that in the storage portion 9, the second decryption key 91 may be stored in a storage element whose storage data is deleted upon contact with air. In addition, in the storage portion 9, when the triggering condition is satisfied, the second decryption key 91 may be prohibited from being read.

For example, in the image forming apparatus 10, a TPM (Trusted Platform Module) is used in the storage portion 9. It is noted that the TPM is a tamper-proof security chip standardized by the TCG (Trusted Computing Group). The TPM executes processes of generating and storing a key, encrypting and decrypting data, and generating a hash value.

It is noted that in the storage portion 9, when the triggering condition is satisfied, the second decryption key 91 may not be made unreadable.

In addition, the image forming apparatus 10 may not include the storage portion 9. That is, in the image forming apparatus 10, the storage portion 9 may not be connected to the connection portion 8.

In addition, as shown in FIG. 2, the control portion 5 includes a first determination processing portion 511, a first detection processing portion 512, a first notification processing portion 513, a second determination processing portion 514, a second detection processing portion 515, and a second notification processing portion 516. Specifically, the control portion 5 causes the CPU 51 to execute the primary boot loader 521 stored in the ROM 52. This allows the control portion 5 to function as the first determination processing portion 511, the first detection processing portion 512, and the first notification processing portion 513. In addition, the control portion 5 causes the CPU 51 to execute the secondary boot loader 71 stored in the storage portion 7. This allows the control portion 5 to function as the second determination processing portion 514, the second detection processing portion 515, and the second notification processing portion 516. Here, the first determination processing portion 511 and the second determination processing portion 514 are an example of the determination processing portion of the present disclosure. In addition, the first detection processing portion 512 and the second detection processing portion 515 are an example of the detection processing portion of the present disclosure. In addition, the first notification processing portion 513 and the second notification processing portion 516 are an example of the notification processing portion of the present disclosure.

The first determination processing portion 511 determines whether or not the storage portion 9 is connected to the connection portion 8.

For example, in the image forming apparatus 10, connection information is preliminarily written to the OTPROM 54 of the control portion 5, the connection information indicating that the storage portion 9 is connected to the connection portion 8. Specifically, the connection information is written to the OTPROM 54 by using the dedicated writer at a time when the storage portion 9 is connected to the connection portion 8. It is noted that in the image forming apparatus 10, when the storage portion 9 has not been connected to the connection portion 8, the connection information is not stored in the OTPROM 54. Here, the OTPROM 54 is an example of the third storage portion of the present disclosure.

For example, the first determination processing portion 511 determines whether or not the storage portion 9 is connected to the connection portion 8, depending on whether or not the connection information is stored in the OTPROM 54.

It is noted that the first determination processing portion 511 may perform a data communication with the storage portion 9, and determine whether or not the storage portion 9 is connected to the connection portion 8 based on success or failure of the data communication.

When the first determination processing portion 511 determines that the storage portion 9 is not connected to the connection portion 8, the first detection processing portion 512 detects presence/absence of falsification in the secondary boot loader 71 by using first decrypted data (an example of the first decrypted data of the present disclosure) that is acquired by decrypting the first electronic signature 72 by using the first decryption key 522.

Specifically, the first detection processing portion 512 acquires, by using the hash function, a hash value of the secondary boot loader 71 that has been read from the storage portion 7 and expanded in the RAM 53. The first detection processing portion 512 then determines that falsification is not present in the secondary boot loader 71 when the acquired hash value matches the first decrypted data. On the other hand, the first detection processing portion 512 determines that falsification is present in the secondary boot loader 71 when the acquired hash value does not match the first decrypted data.

In addition, when the first determination processing portion 511 determines that the storage portion 9 is connected to the connection portion 8, the first detection processing portion 512 detects presence/absence of falsification in the secondary boot loader 71, by using second decrypted data (an example of the second decrypted data of the present disclosure) that is acquired by decrypting the second electronic signature 73 by using the second decryption key 91.

Specifically, the first detection processing portion 512 acquires, by using the hash function, a hash value of the secondary boot loader 71 that has been read from the storage portion 7 and expanded in the RAM 53. The first detection processing portion 512 then determines that falsification is not present in the secondary boot loader 71 when the acquired hash value matches the second decrypted data. On the other hand, the first detection processing portion 512 determines that falsification is present in the secondary boot loader 71 when the acquired hash value does not match the second decrypted data.

When the first detection processing portion 512 has detected falsification in the secondary boot loader 71, the first notification processing portion 513 notifies thereof.

For example, the first notification processing portion 513 displays, on the operation/display portion 6, a message indicating that falsification was detected in the secondary boot loader 71. It is noted that the first notification processing portion 513 may make an alarm sound indicating that falsification was detected in the secondary boot loader 71.

The second determination processing portion 514, as is the case with the first determination processing portion 511, determines whether or not the storage portion 9 is connected to the connection portion 8.

When the second determination processing portion 514 determines that the storage portion 9 is not connected to the connection portion 8, the second detection processing portion 515 detects presence/absence of falsification in the OS 74 by using third decrypted data (an example of the first decrypted data of the present disclosure) that is acquired by decrypting the first electronic signature 75 by using the first decryption key 522.

Specifically, the second detection processing portion 515 acquires, by using the hash function, a hash value of the OS 74 that has been read from the storage portion 7 and expanded in the RAM 53. The second detection processing portion 515 then determines that falsification is not present in the OS 74 when the acquired hash value matches the third decrypted data. On the other hand, the second detection processing portion 515 determines that falsification is present in the OS 74 when the acquired hash value does not match the third decrypted data.

In addition, when the second determination processing portion 514 determines that the storage portion 9 is connected to the connection portion 8, the second detection processing portion 515 detects presence/absence of falsification in the OS 74, by using fourth decrypted data (an example of the second decrypted data of the present disclosure) that is acquired by decrypting the second electronic signature 76 by using the second decryption key 91.

Specifically, the second detection processing portion 515 acquires, by using the hash function, a hash value of the OS 74 that has been read from the storage portion 7 and expanded in the RAM 53. The second detection processing portion 515 then determines that falsification is not present in the OS 74 when the acquired hash value matches the fourth decrypted data. On the other hand, the second detection processing portion 515 determines that falsification is present in the OS 74 when the acquired hash value does not match the fourth decrypted data.

When the second detection processing portion 515 has detected falsification in the OS 74, the second notification processing portion 516 notifies thereof.

For example, the second notification processing portion 516 displays, on the operation/display portion 6, a message indicating that falsification was detected in the OS 74. It is noted that the second notification processing portion 516 may make an alarm sound indicating that falsification was detected in the OS 74.

[First Start-Up Process]

Figure 4:
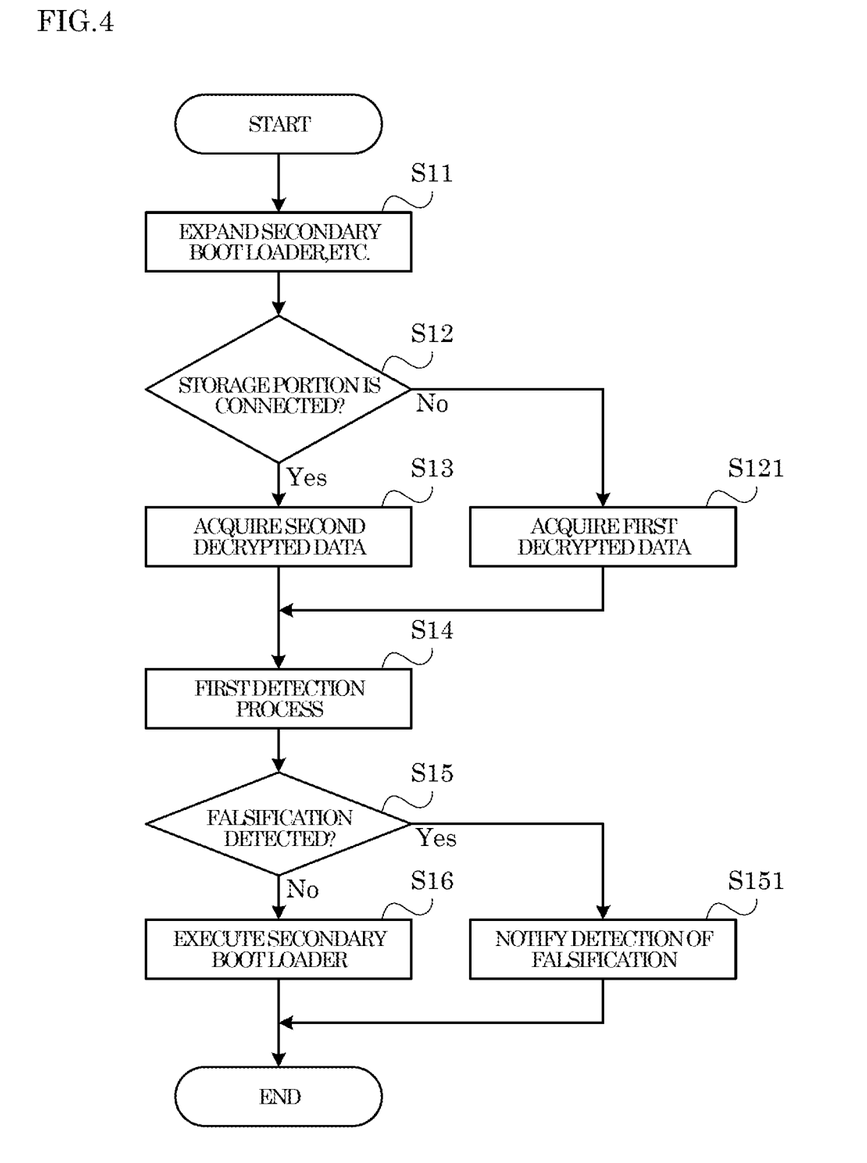
FIG. 4 is a flowchart showing an example of a first start-up process executed in the image forming apparatus according to the embodiment of the present disclosure.

In the following, with reference to FIG. 4, a description is given of an example of the procedure of a first start-up process executed by the control portion 5 in the image forming apparatus 10. Here, steps S11, S12, . . . represent numbers assigned to the processing procedures (steps) executed by the control portion 5. It is noted that the control portion 5 executes the first start-up process when the image forming apparatus 10 is powered on, or when a user operation is performed to instruct to restart the image forming apparatus 10.

<Step S11>

First, in step S11, the control portion 5 reads the secondary boot loader 71, the first electronic signature 72, and the second electronic signature 73 from the storage portion 7, and expands them into the RAM 53.

<Step S12>

In step S12, the control portion 5 determines whether or not the storage portion 9 is connected to the connection portion 8. Here, the process of step S12 is executed by the first determination processing portion 511 of the control portion 5.

For example, when the connection information is present in the OTPROM 54, the control portion 5 determines that the storage portion 9 is connected to the connection portion 8. With this configuration, compared to a configuration where the determination on whether or not the storage portion 9 is connected to the connection portion 8 is made based on success or failure of a data communication with the storage portion 9, it is possible to prevent the storage portion 9 connected to the connection portion 8, from being disconnected from the connection portion 8. In addition, with the configuration where the OTPROM 54 is used as the storage portion in which the connection information is stored, the connection information is prevented from being deleted.

Here, upon determining that the storage portion 9 is connected to the connection portion 8 (Yes side at S12), the control portion 5 moves the process to step S13. In addition, upon determining that the storage portion 9 is not connected to the connection portion 8 (No side at S12), the control portion 5 moves the process to step S121.

<Step S121>

In step S121, the control portion 5 acquires the first decrypted data. Specifically, the control portion 5 acquires the first decrypted data by decrypting the first electronic signature 72 by using the first decryption key 522.

<Step S13>

In step S13, the control portion 5 acquires the second decrypted data. Specifically, the control portion 5 causes the storage portion 9 to execute a decryption process of decrypting the second electronic signature 73 by using the second decryption key 91 and output the second decrypted data. It is noted that the control portion 5 may acquire the second decrypted data by reading the second decryption key 91 from the storage portion 9 and decrypting the second electronic signature 73 by using the read second decryption key 91.

<Step S14>

In step S14, the control portion 5 executes a first detection process of detecting falsification in the secondary boot loader 71, by using the first decrypted data acquired in step S121 or the second decrypted data acquired in step S13.

Here, the processes of step S121, step S13, and step S14 are executed by the first detection processing portion 512 of the control portion 5.

Specifically, control portion 5 acquires, by using the hash function, a hash value of the secondary boot loader 71 that has been expanded in the RAM 53 in step S11. Subsequently, the control portion 5 determines that falsification is not present in the secondary boot loader 71 when the acquired hash value matches the first decrypted data or the second decrypted data. On the other hand, the control portion 5 determines that falsification is present in the secondary boot loader 71 when the acquired hash value does not match either the first decrypted data or the second decrypted data.

<Step S15>

In step S15, the control portion 5 determines whether or not falsification was detected in the secondary boot loader 71 in the first detection process executed in step S14.

Here, upon determining that falsification in the secondary boot loader 71 has been detected in the first detection process (Yes side at S15), the control portion 5 moves the process to step S151. In addition, upon determining that falsification was not detected in the secondary boot loader 71 in the first detection process (No side at S15), the control portion 5 moves the process to step S16.

<Step S151>

In step S151, the control portion 5 notifies that falsification was detected in the secondary boot loader 71. For example, the control portion 5 displays, on the operation/display portion 6, a message indicating that falsification was detected in the secondary boot loader 71. Here, the process of step S151 is executed by the first notification processing portion 513 of the control portion 5.

<Step S16>

In step S16, the control portion 5 executes the secondary boot loader 71 that has been expanded in the RAM 53 in step S11.

[Second Start-Up Process]

Figure 5:
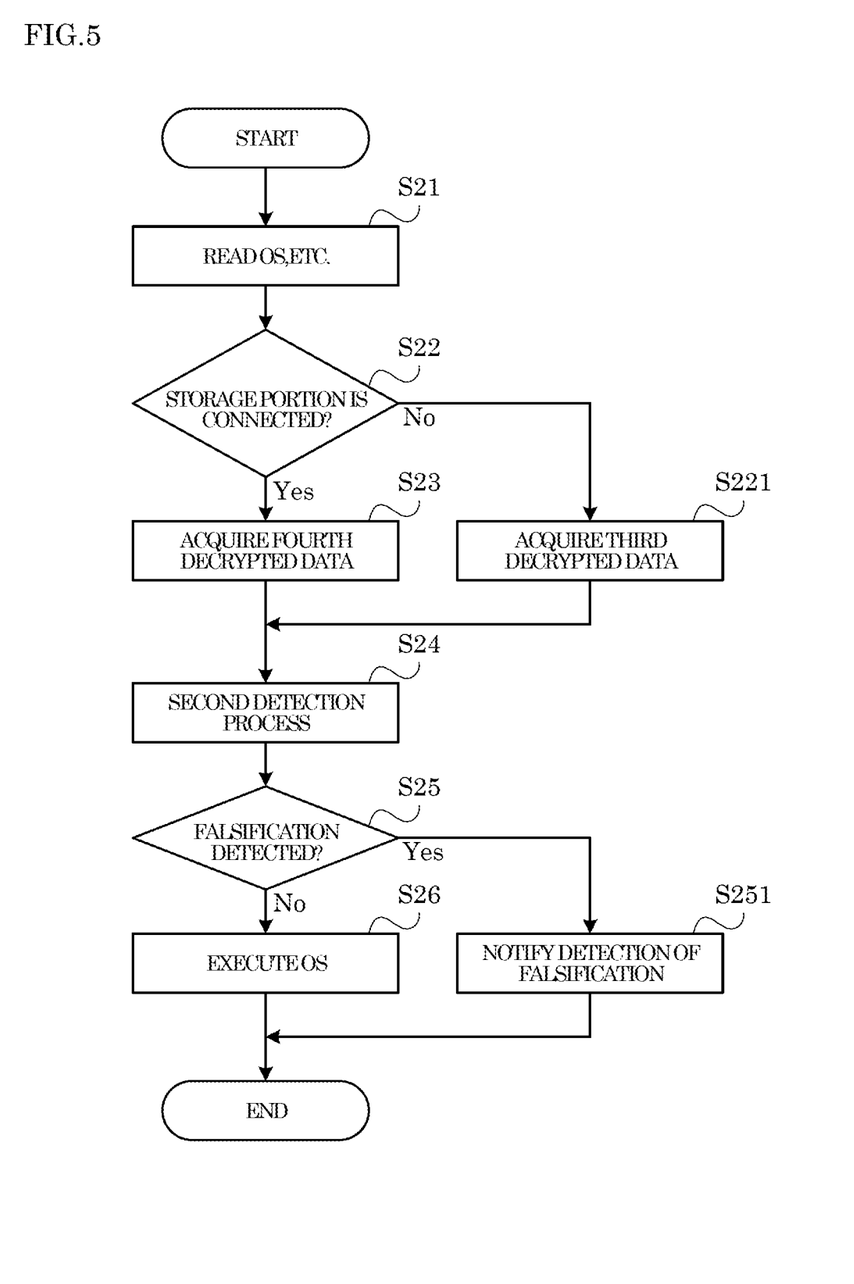
FIG. 5 is a flowchart showing an example of a second start-up process executed in the image forming apparatus according to the embodiment of the present disclosure.

In the following, with reference to FIG. 5, a description is given of an example of the procedure of a second start-up process executed by the control portion 5 in the image forming apparatus 10. It is noted that the control portion 5 executes the second start-up process when the process of step S16 is executed in the first start-up process.

<Step S21>

First, in step S21, the control portion 5 reads the OS 74, the first electronic signature 75, and the second electronic signature 76 from the storage portion 7, and expands them into the RAM 53.

<Step S22>

In step S22, as in step S12 of the first start-up process, the control portion 5 determines whether or not the storage portion 9 is connected to the connection portion 8. Here, the process of step S22 is executed by the second determination processing portion 514 of the control portion 5.

Here, upon determining that the storage portion 9 is connected to the connection portion 8 (Yes side at S22), the control portion 5 moves the process to step S23. In addition, upon determining that the storage portion 9 is not connected to the connection portion 8 (No side at S22), the control portion 5 moves the process to step S221.

<Step S221>

In step S221, the control portion 5 acquires the third decrypted data. Specifically, the control portion 5 acquires the third decrypted data by decrypting the first electronic signature 75 by using the first decryption key 522.

<Step S23>

In step S23, the control portion 5 acquires the fourth decrypted data. Specifically, the control portion 5 causes the storage portion 9 to execute a decryption process of decrypting the second electronic signature 76 by using the second decryption key 91 and output the fourth decrypted data. It is noted that the control portion 5 may acquire the fourth decrypted data by reading the second decryption key 91 from the storage portion 9 and decrypting the second electronic signature 76 by using the read second decryption key 91.

<Step S24>

In step S24, the control portion 5 executes a second detection process of detecting falsification in the OS 74, by using the third decrypted data acquired in step S221 or the fourth decrypted data acquired in step S23. Here, the processes of step S221, step S23, and step S24 are executed by the second detection processing portion 515 of the control portion 5.

Specifically, control portion 5 acquires, by using the hash function, a hash value of the OS 74 that has been expanded in the RAM 53 in step S21.

Subsequently, the control portion 5 determines that falsification is not present in the OS 74 when the acquired hash value matches the third decrypted data or the fourth decrypted data. On the other hand, the control portion 5 determines that falsification is present in the OS 74 when the acquired hash value does not match either the third decrypted data or the fourth decrypted data.

<Step S25>

In step S25, the control portion 5 determines whether or not falsification was detected in the OS 74 in the second detection process executed in step S24.

Here, upon determining that falsification was detected in the OS 74 in the second detection process (Yes side at S25), the control portion 5 moves the process to step S251. In addition, upon determining that falsification was not detected in the OS 74 in the second detection process (No side at S25), the control portion 5 moves the process to step S26.

<Step S251>

In step S251, the control portion 5 notifies that falsification was detected in the OS 74. For example, the control portion 5 displays, on the operation/display portion 6, a message indicating that falsification was detected in the OS 74. Here, the process of step S251 is executed by the second notification processing portion 516 of the control portion 5.

<Step S26>

In step S26, the control portion 5 executes the OS 74 that has been expanded in the RAM 53 in step S21.

As described above, in the image forming apparatus 10, when it is determined that the storage portion 9 is not connected to the connection portion 8, presence/absence of falsification in the secondary boot loader 71 is detected by using the first decrypted data that is acquired by decrypting the first electronic signature 72 by using the first decryption key 522, and when it is determined that the storage portion 9 is connected to the connection portion 8, presence/absence of falsification in the secondary boot loader 71 is detected by using the second decrypted data that is acquired by decrypting the second electronic signature 73 by using the second decryption key 91.

In addition, in the image forming apparatus 10, when it is determined that the storage portion 9 is not connected to the connection portion 8, presence/absence of falsification in the OS 74 is detected by using the third decrypted data that is acquired by decrypting the first electronic signature 75 by using the first decryption key 522, and when it is determined that the storage portion 9 is connected to the connection portion 8, presence/absence of falsification in the OS 74 is detected by using the fourth decrypted data that is acquired by decrypting the second electronic signature 76 by using the second decryption key 91.

With the above-described configuration, in the image forming apparatus 10, it is possible to detect falsification in the programs such as the primary boot loader 521 and the secondary boot loader 71 that are executed during the start-up, by using the second decryption key 91 stored in the storage portion 9 that is an added storage portion, without changing the content of the programs.

In addition, in the image forming apparatus 10, when a predetermined triggering condition is satisfied, the second decryption key 91 is made unreadable in the storage portion 9. This improves the confidentiality of the second decryption key 91, thereby preventing the second electronic signature 73 and the second electronic signature 76 from being forged, and preventing the secondary boot loader 71 and the OS 74 from being falsified.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
a first storage portion storing a first decryption key that is used to decrypt a first electronic signature, wherein the first electronic signature and a second electronic signature have been added to detection target programs that are expanded into a memory during a start-up of the information processing apparatus;
a connection portion configured to be connected with a second storage portion storing a second decryption key that is used to decrypt the second electronic signature and is different from the first decryption key;
a determination processing portion configured to determine whether or not the second storage portion is connected to the connection portion; and
a detection processing portion configured to, when the determination processing portion has determined that the second storage portion is not connected to the connection portion, detect presence/absence of falsification in the detection target programs by using first decrypted data that is acquired by decrypting the first electronic signature by using the first decryption key, and when the determination processing portion has determined that the second storage portion is connected to the connection portion, detect presence/absence of falsification in the detection target programs by using second decrypted data that is acquired by decrypting the second electronic signature by using the second decryption key.

2. The information processing apparatus according to claim 1, further comprising:
the second storage portion which is connected to the connection portion and in which the second decryption key is made unreadable when a predetermined triggering condition is satisfied.

3. The information processing apparatus according to claim 1, further comprising:
  a third storage portion for storing connection information indicating that the second storage portion is connected to the connection portion, wherein
  the determination processing portion determines whether or not the second storage portion is connected to the connection portion, based on presence or absence of the connection information in the third storage portion.

4. The information processing apparatus according to claim 3, wherein
  the third storage portion is a one-time programmable read-only memory.

5. The information processing apparatus according to claim 1, further comprising:
  a notification processing portion configured to, when the detection processing portion has detected falsification in the detection target programs, notify that falsification has been detected in the detection target programs.

6. A falsification detecting method executed in an information processing apparatus including a first storage portion and a connection portion, the first storage portion storing a first decryption key that is used to decrypt a first electronic signature, wherein the first electronic signature and a second electronic signature have been added to detection target programs that are expanded into a memory during a start-up of the information processing apparatus, the connection portion being configured to be connected with a second storage portion storing a second decryption key that is used to decrypt the second electronic signature and is different from the first decryption key, the falsification detecting method comprising:
  determining whether or not the second storage portion is connected to the connection portion; and
  when it has been determined that the second storage portion is not connected to the connection portion, detecting presence/absence of falsification in the detection target programs by using first decrypted data that is acquired by decrypting the first electronic signature by using the first decryption key, and when it has been determined that the second storage portion is connected to the connection portion, detecting presence/absence of falsification in the detection target programs by using second decrypted data that is acquired by decrypting the second electronic signature by using the second decryption key.

* * * * *